Figure 1A:
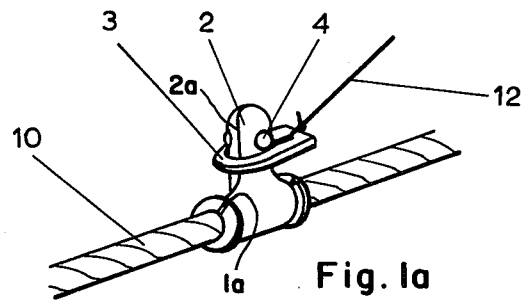

United States Patent [19]

Huse

[11] 4,149,336

[45] Apr. 17, 1979

[54] ARRANGEMENT FOR DETACHABLE JOINT BETWEEN A LINE AND A SNOOD

[75] Inventor: Per Huse, Haslum, Norway

[73] Assignee: O. Mustad & Son A.S., Oslo, Norway

[21] Appl. No.: 852,997

[22] Filed: Nov. 18, 1977

[51] Int. Cl.² .............................................. A01K 91/04
[52] U.S. Cl. .................................. 43/44.9; 24/115 R; 43/44.84; 403/344
[58] Field of Search .................... 24/115 R; 43/44.83, 43/44.84, 44.98, 44.9, 44.91; 403/191, 310, 313, 237, 344

[56] References Cited

U.S. PATENT DOCUMENTS

| 430,043 | 6/1890 | Seiders et al. ...................... 24/115 R |
| 3,533,184 | 10/1970 | Kerr ..................................... 403/191 |
| 3,893,605 | 7/1975 | Mew ..................................... 403/344 |

FOREIGN PATENT DOCUMENTS 681566  10/1952  United Kingdom ..................... 403/310

Primary Examiner—Kenneth J. Dorner
Attorney, Agent, or Firm—Ladas, Parry, Von Gehr, Goldsmith & Deschamps

[57] ABSTRACT

Joint for attachment of a snood to a fishing line comprising a split sleeve with end flanges, surrounded by a rotating part shaped as two cylindrical halves of a stud to which the snood is to be attached.

2 Claims, 5 Drawing Figures

ARRANGEMENT FOR DETACHABLE JOINT BETWEEN A LINE AND A SNOOD

Fishing lines, particularly longlines normally have the snoods permantly fixed to the line. This makes handling of the line cumbersome and time consuming, particularly because the fisherman has to take great care not to get the fishinghook in tangle in the line. The following invention concerns a simplified method for handling and storing a fishing line and snoods.

Many methods of detachable snoods are known, but only a few have any practical value. Some employ a key hole slot into which the line is pressed and where it remains fixed due to friction. Others are shaped in such a way that the line is forced into a Z shaped pattern when the snood is pulled parallel to the line—thereby further locking the snood to the line. Such joints are usually made from steel wire, often stainless steel wire. The joint does not act as swivel. If the line rotates the snoods will be wound around the line which is highly undesirable and bound to complicate the subsequent handling of the line. Norwegian Pat. application No. 1270/70 is an example of a kind of joint where the snoods are fixed to the line by means of a clip and intended to be stripped off while the line is hauled onboard.

Norwegian Pat. application No. 2366/68 on the other hand shows a joint with a built in swivel motion. This solution however, does not lend itself readily to automatic detachment and attachment.

This invention represents an excellent solution for a joint which can easily be detached and attached in a mechanical way. The joint acts as a good swivel and is at the same time easy to detach and attach automatically.

It provides good opportunities for a small and compact semiautomatic machine for handling of the line.

Figure 1B:
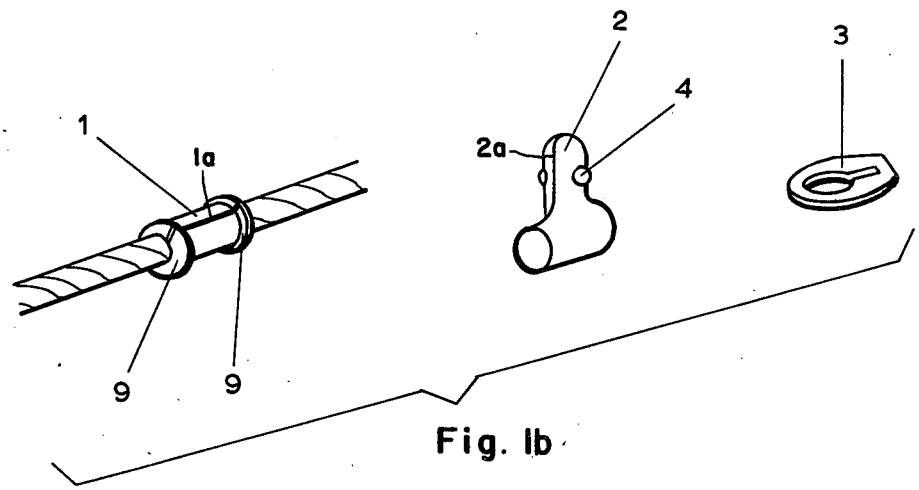
Figure 2:
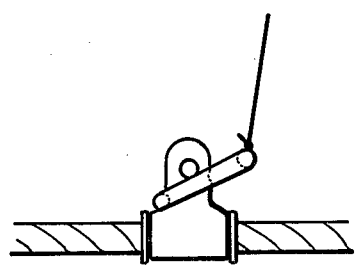
Figure 3:
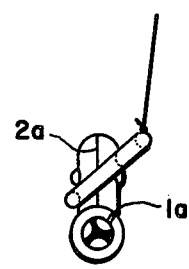
Figure 4:
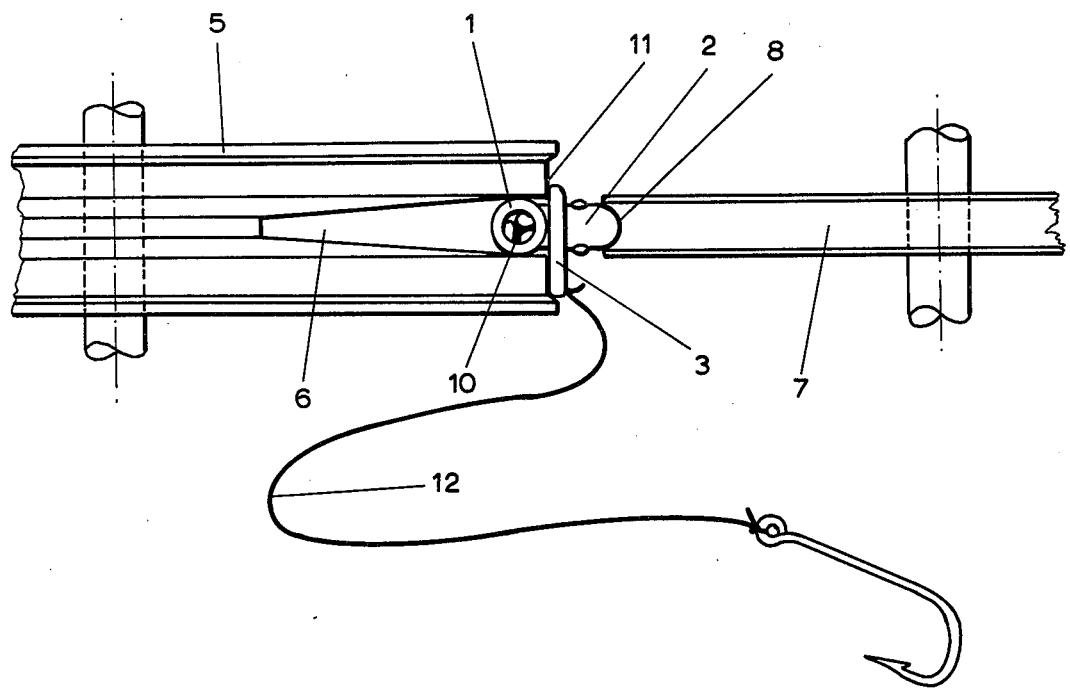

The invention will now be described, by way of example, with reference to the accompanying drawings in which:

FIG. 1(a) shows in assembled form a device for connecting a snood to a fishing line, FIG. 1(b) shows the various parts of the device of FIG. 1(a) when disassembled, FIGS. 2 and 3 illustrate operation of the device, and FIG. 4 shows part of a machine for automatically detaching a snood connected to a fishing line by means of the device illustrated in FIG. 1(a).

The device illustrated in FIG. 1(a) forms a detachable joint between the snood 12 and the line 10 and consists of a sleeve 1, a stud 2 with lugs 4, and an elastic ring 3. The ring 3 is prevented from being pulled over the lugs 4 on the stud 2 by the snood due to the special shape of the ring because the force acts on the ring at a point well to the side of its center causing a twisting moment, see FIG. 2 which tends to lock the ring in position. If the ring should be pulled over one of the lugs, see FIG. 3, then the force from the snood will act diagonally and lock the ring in position under the opposite lug and stop the ring from being pulled loose.

The sleeve 1 comprises a single member which is partly split at 1a to enable it to be fitted about the line 10. The stud 2 also comprises a single member which is partly split at 2a to enable it to be fitted about the sleeve 1.

FIG. 4 shows a possible way of automatically detaching the snood from the line. The ring 3 rests against two flanges while the stud is pressed through the ring. This apparatus can for instance consist of two spring loaded wheels one of which 5 is shaped as a line hauler sheave with flanges 11 for the ring 3, but with sufficient room for the sleeve 1 and the stud 2 to be pressed into the wedge shaped groove 6 while the ring 3 is held back by the flanges.

The stud is pressed through the ring by the spring loaded wheel 7 which has its periphery shaped to fit the curvature of the stud. Knots and other obstructions on the line will pass unhindered because the wheel 7 will give away due to its spring loaded support. This apparatus can be linked with another apparatus which collects the detached snoods and accumulates them in such a way that subsequent handling is easily facilitated.

Having described my invention, I claim:

1. A device for connecting a snood to a fishing line, comprising:

a sleeve defining an aperture through which the fishing line can pass and having flanges at opposite ends thereof and a substantially cylindrical outer surface extending between the flanges;

a tubular member defining a substantially cylindrical aperture whose diameter is substantially equal to that of said substantially cylindrical outer surface, whereby the tubular member can be fitted about the sleeve to rotate with respect thereto, being retained against movement along the sleeve by said flanges, the tubular member having a radially-projecting portion; and a snood attachment portion for connection to the snood, one of said portions being of generally cylindrical form and having two opposed lugs projecting radially therefrom, and the other of said portions being elastic and defining an opening corresponding to the diameter of said one portion, whereby said one portion can be inserted into the opening of said other portion and said other portion can be forced over the lugs of said one portion.

2. In combination, a fishing line and a device for connecting a snood to the fishing line, said device comprising:

a sleeve defining an aperture through which the fishing line extends and having flanges at opposite ends thereof and a substantially cylindrical outer surface extending between the flanges;

a tubular member defining a substantially cylindrical aperture whose diameter is substantially equal to that of said substantially cylindrical outer surface, whereby the tubular member can be fitted about the sleeve to rotate with respect thereto, being retained against movement along the sleeve by said flanges, the tubular member having a radially-projecting portion; and a snood attachment portion for connection to the snood, one of said portions being of generally cylindrical form and having two opposed lugs projecting radially therefrom, and the other of said portions being elastic and defining an opening corresponding to the diameter of said one portion, whereby said one portion can be inserted into the opening of said other portion and said other portion can be forced over the lugs of said one portion.

* * * * *